(12) United States Patent
Pard et al.

(10) Patent No.: US 7,475,751 B2
(45) Date of Patent: Jan. 13, 2009

(54) SNOW VEHICLE

(75) Inventors: Jean-Sebastien Pard, Tinwick (CA); Daniel Perreault, St-Nicephore (CA); Jerome Wubbolts, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 301 days.

(21) Appl. No.: 11/395,244

(22) Filed: Apr. 3, 2006

(65) Prior Publication Data

US 2006/0232028 A1   Oct. 19, 2006

Related U.S. Application Data

(60) Provisional application No. 60/667,120, filed on Apr. 1, 2005.

(51) Int. Cl.
*B62M 27/02* (2006.01)

(52) U.S. Cl. ........................................ 180/190; 180/309

(58) Field of Classification Search .................. 180/190, 180/184, 309, 89.2, 9.1, 9.25
See application file for complete search history.

(56) References Cited

U.S. PATENT DOCUMENTS

| | | | |
|---|---|---|---|
| 1,968,975 A | 8/1934 | Upsacker et al. | |
| 2,738,845 A | 3/1956 | Bizjak | |
| 3,151,876 A | 10/1964 | Hahto | |
| 3,252,533 A | 5/1966 | Aeder et al. | |
| 3,318,403 A | 5/1967 | Hansen | |
| 3,464,510 A | 9/1969 | Washiza et al. | |
| 3,568,787 A | 3/1971 | Gremeret | |
| 3,757,880 A | 9/1973 | Jones | |
| 3,779,327 A * | 12/1973 | Perreault | 180/190 |
| 3,783,958 A | 1/1974 | Canavan | |
| 3,847,239 A | 11/1974 | Copeland | |
| 3,872,938 A | 3/1975 | DeGroot | |
| 3,985,192 A * | 10/1976 | Samuelson et al. | 180/190 |
| 4,262,767 A | 4/1981 | Weygant | |
| 4,307,788 A | 12/1981 | Shelton | |
| 4,434,867 A | 3/1984 | Grinde | |
| 4,442,913 A | 4/1984 | Grinde | |
| 4,502,560 A | 3/1985 | Hisatomi | |
| 4,613,006 A | 9/1986 | Moss et al. | |
| 4,714,125 A | 12/1987 | Stacy, Jr. | |
| 4,719,983 A | 1/1988 | Bruzzone | |
| 4,768,794 A | 9/1988 | Bibollet | |
| 4,823,903 A | 4/1989 | Bibollet et al. | |
| 4,984,648 A | 1/1991 | Strzok | |
| 5,203,424 A | 4/1993 | Gogo et al. | |
| 5,474,146 A | 12/1995 | Yoshioka et al. | |
| 5,516,126 A | 5/1996 | Myers | |

(Continued)

FOREIGN PATENT DOCUMENTS

CA        1078896        6/1980

(Continued)

*Primary Examiner*—Tony H. Winner
(74) *Attorney, Agent, or Firm*—Osler, Hoskin & Harcourt LLP (57) ABSTRACT

A snow vehicle has a steering assembly for steering a ski, an endless track to propel the vehicle, and an engine to power the endless track. A platform is provided for a rider of the vehicle to stand on while operating the vehicle. An exhaust chamber of the vehicle is disposed between the steering assembly and the forward end of the platform.

19 Claims, 7 Drawing Sheets

U.S. PATENT DOCUMENTS

| | | | |
|---|---|---|---|
| 5,533,585 | A | 7/1996 | Kawano et al. |
| 5,568,840 | A | 10/1996 | Nagata et al. |
| 5,586,614 | A * | 12/1996 | Kouchi et al. ............... 180/190 |
| D389,780 | S | 1/1998 | Komatsu et al. |
| 5,727,643 | A | 3/1998 | Kawano et al. |
| 5,829,545 | A | 11/1998 | Yamamoto et al. |
| 5,853,061 | A | 12/1998 | Yamamoto et al. |
| 5,904,217 | A | 5/1999 | Yamamoto et al. |
| 5,947,220 | A | 9/1999 | Oka et al. |
| 5,964,311 | A | 10/1999 | Yamamoto et al. |
| 5,996,717 | A | 12/1999 | Hisadomi |
| 6,006,715 | A | 12/1999 | Izumi et al. |
| 6,032,754 | A | 3/2000 | Izumi et al. |
| 6,070,683 | A | 6/2000 | Izumi et al. |
| 6,112,840 | A | 9/2000 | Forbes |
| 6,170,589 | B1 | 1/2001 | Kawano et al. |
| 6,170,590 | B1 | 1/2001 | Hisadomi |
| 6,234,263 | B1 | 5/2001 | Boivin et al. |
| 6,302,232 | B1 | 10/2001 | Forbes |
| 6,321,864 | B1 | 11/2001 | Forbes |
| 6,382,338 | B1 | 5/2002 | Forbes |
| 6,431,301 | B1 | 8/2002 | Forbes |
| 6,435,290 | B1 | 8/2002 | Justus et al. |
| 6,464,033 | B2 | 10/2002 | Izumi et al. |
| D476,599 | S | 7/2003 | Whittington |

FOREIGN PATENT DOCUMENTS

| | | |
|---|---|---|
| CA | 1091728 | 12/1980 |
| CA | 1095563 | 2/1981 |
| CA | 1095564 | 2/1981 |
| CA | 1117169 | 1/1982 |
| CA | 1123878 | 5/1982 |
| CA | 1133031 | 10/1982 |
| CA | 1141804 | 2/1983 |
| CA | 1196046 | 10/1985 |
| CA | 1198133 | 12/1985 |
| CA | 2002997 | 6/1990 |
| CA | 2032462 | 6/1991 |
| CA | 1287658 | 8/1991 |
| CA | 2035633 | 8/1991 |
| CA | 1299223 | 4/1992 |
| CA | 2067409 | 10/1992 |
| CA | 1331034 | 7/1994 |
| CA | 2143383 | 3/1996 |
| CA | 2151024 | 3/1996 |
| CA | 2243019 | 1/1999 |
| CA | 2321860 | 9/1999 |
| CA | 2143384 | 11/1999 |
| CA | 2143385 | 11/1999 |
| CA | 2285888 | 4/2000 |
| CA | 2281341 | 3/2001 |
| CA | 2317223 | 3/2001 |
| CA | 2347651 | 5/2001 |
| CA | 2345490 | 10/2001 |
| CA | 2343465 | 10/2002 |
| CA | 2228114 | 4/2004 |
| CA | 2260192 | 4/2005 |
| CA | 2197612 | 7/2005 |
| CA | 2158526 | 11/2005 |
| CA | 2228102 | 12/2005 |
| JP | 404005188 A | 1/1992 |
| JP | 405201380 A | 8/1993 |

* cited by examiner

SNOW VEHICLE

CROSS-REFERENCE

This application claims priority to U.S. patent application 60/667,120, filed Apr. 1, 2005, entitled "Snow Vehicle", the entirety of which is incorporated herein by reference.

FIELD OF THE INVENTION

The present invention relates to snow vehicles. In particular, the present invention relates to a snow vehicle having a platform upon which the rider stands during normal operation of the vehicle.

BACKGROUND OF THE INVENTION

The most common type of snow vehicle is the snowmobile. Snowmobiles are propelled by an endless track and steered by a pair of skis provided at the front thereof. A straddle seat for accommodating one or more riders in a seated position during normal operation of the vehicle is mounted to a frame of the snowmobile above the endless track. An engine compartment is provided at the front of the snowmobile. The engine which powers the endless track, and the other components necessary to the operation of the engine, such as the air box, fuel tank, and exhaust system, are disposed inside the engine compartment.

Another type of snow vehicle, which is less common, is also propelled by an endless track powered by an engine, however there is no seat provided for the rider. Instead, a platform is mounted to the frame of the snow vehicle above the endless track. Therefore, the rider of the snow vehicle stands on the platform to operate the snow vehicle during normal operation of the vehicle. For this reason, and since it has no generic name, this type of snow vehicle will be referred to herein as a stand-up snow vehicle. Such vehicles are generally steered by a single ski. Stand-up snow vehicles provide a much different riding experience than the more traditional snowmobiles.

Stand-up snow vehicles are generally smaller than snowmobiles and typically have less room for accommodating the various components thereof. For this reason, one of the challenges faced when designing such a vehicle resides in accommodating the engine and its components on the vehicle. U.S. Pat. Nos. 5,966,717; 5,904,217; and 6,032,754; all assigned to Honda Giken Kogyo Kabushiki Kaisha, illustrate various ways in which components could be arranged on a stand-up snow vehicle. However, each of these arrangements have portions of the exhaust system extending in front of the vehicle which have to be concealed by covers. This adds weight to the vehicle and adds cost and complexity to the manufacturing of the vehicle.

Therefore, there is a need to provide a stand-up snow vehicle having an improved compact arrangement of the engine and its components.

STATEMENT OF THE INVENTION

One aspect of the invention provides a stand-up snow vehicle having an exhaust chamber disposed between the steering assembly and the frame of the vehicle.

Another aspect of the invention provides a stand-up snow vehicle having an engine mounted to the frame of the vehicle and an exhaust chamber disposed below the engine between the steering assembly and the frame.

In another aspect, the invention provides a snow vehicle having a frame having a first generally horizontal frame portion and a second frame portion extending upwardly from a forward portion of the first frame portion. A steering assembly is operatively connected to a forward portion of the frame. A ski is connected to the steering assembly. A platform is disposed on the first frame portion to accommodate a rider in a standing position. An endless track is mounted to the first frame portion below the platform to propel the snow vehicle. An engine is mounted to the frame and is operatively connected to the endless track to power the endless track. The engine has an exhaust port. An exhaust chamber in fluid communication with the exhaust port receives exhaust gases from the engine. The exhaust chamber is disposed between the steering assembly and the forward end of the platform when viewed from a side elevation view of the vehicle. An exhaust conduit extends from the exhaust chamber to fluidly communicate the exhaust chamber with the atmosphere.

In a further aspect, the exhaust chamber is a muffler.

In an additional aspect, the exhaust conduit extends vertically downwardly from the muffler.

In yet a further aspect, the muffler is disposed transversely to a longitudinal axis of the snow vehicle.

In another aspect, the engine has a crankcase and a cylinder, the cylinder extends generally horizontally and the exhaust chamber is disposed below the cylinder.

In yet another aspect, the invention provides a snow vehicle having a frame having a first generally horizontal frame portion and a second frame portion extending generally upwardly from a forward portion of the first frame portion. A steering assembly is pivotally connected to a forward portion of the frame. The steering assembly pivots about a steering axis. A ski is connected to the steering assembly. A platform is disposed on the first frame portion to accommodate a rider in a standing position. An endless track is mounted to the first frame portion below the platform to propel the snow vehicle. An engine is mounted to the frame and is operatively connected to the endless track to power the endless track. The engine has an exhaust port and a cylinder axis. The cylinder axis extends generally horizontally. A muffler in fluid communication with the exhaust port receives exhaust gases from the engine. The muffler is disposed rearwardly of the steering axis and below the cylinder axis when from a side elevation view of the vehicle. An exhaust conduit extends from the muffler to fluidly communicate the muffler with the atmosphere.

For purposes of this application, terms used to locate elements on the snow vehicle, such as "front", "back", "rear", "forward", "rearward", "left", "right", "up", "down", "above", and "below", are as they would normally be understood by a rider of the vehicle standing on the vehicle in a forwardly facing, driving position.

Additional and/or alternative features, aspects, and advantages of the embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE INVENTION

As seen in FIGS. 1 to 6, the snow vehicle 10 of the present invention has a frame 12 made of various frame portions. A forward frame portion 14 extends generally upwardly and forwardly from the end of a rearward frame portion 16. A lower frame portion 18 extends downwardly from a point near the center of the rearward frame portion 16, then horizontally towards a front of the snow vehicle 10, and then upwardly to a lower end of a central frame member, or head pipe, 20. The central frame member 20 extends generally vertically and joins the forward end of the forward frame portion 14 to the forward end of the lower frame portion 18. A pair of cross members 22 are provided between the forward frame portion 14 and the lower frame portion 18. Another cross member 24 is provided transversely on the forward frame portion 12. The cross member 22, 24 rigidify the frame 12. The frame 12 is preferably made of a tubular structure.

The rearward frame portion 16 is disposed generally horizontally and has a platform 26 mounted thereon upon which a rider of the snow vehicle 10 stands to operate the snow vehicle. The top surface of the platform 26 preferably has an anti-slip surface. It is contemplated that the platform 26 could be integrally formed with the rearward frame portion 16.

A pair of plates 28 are attached to the rearward frame portion 16 to mount an endless track 30. The endless track 30 is provided below the platform 26 and is used to propel the snow vehicle 10 over snow. Slide rails 32, idler wheels 34, and a suspension arm 36 support the endless track 30 below the rear platform 14.

A steering assembly made of handle bars 38 and a pair suspension elements 40 is pivotally mounted to an upper end of the central frame member 20 so as to pivot about a steering axis 41 (FIG. 1) passing through the central frame member 20. The suspension elements 40 preferably consist of a cylinder and a spring assembly. Alternatively, the suspension elements 40 consist of a hydraulic assembly. A pair of handles 42 are disposed on the handle bars 38. The right handle 42 can preferably twist about the right handle bar 38 and is used to control a throttle of the engine 44 of the snow vehicle 10. Alternatively, a finger actuated throttle lever could be provided near the right handle 42. A finger actuated brake lever 46 is provided near the left handle 42 to brake the snow vehicle 10 as will be explained in greater details below. A single ski 48 is attached to the lower ends of the pair of suspension elements 40 through attachment brackets 50. The ski 48 facilitates movement of the snow vehicle 10 over snow and is used to steer the snow vehicle 10 by turning the handle bars 38.

Figure 1:
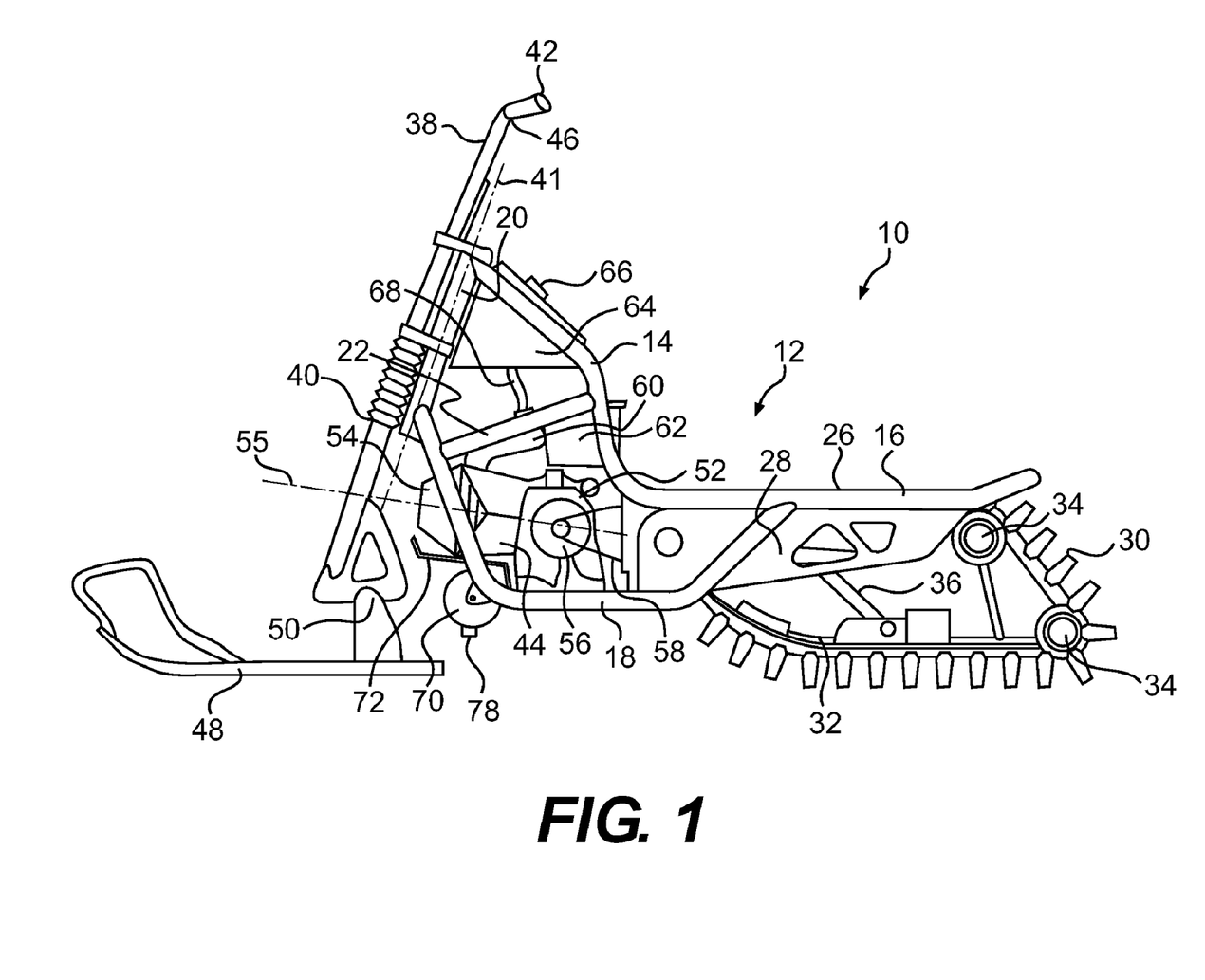
FIG. 1 is a left side elevation view of the snow vehicle of the present invention.
Figure 2:
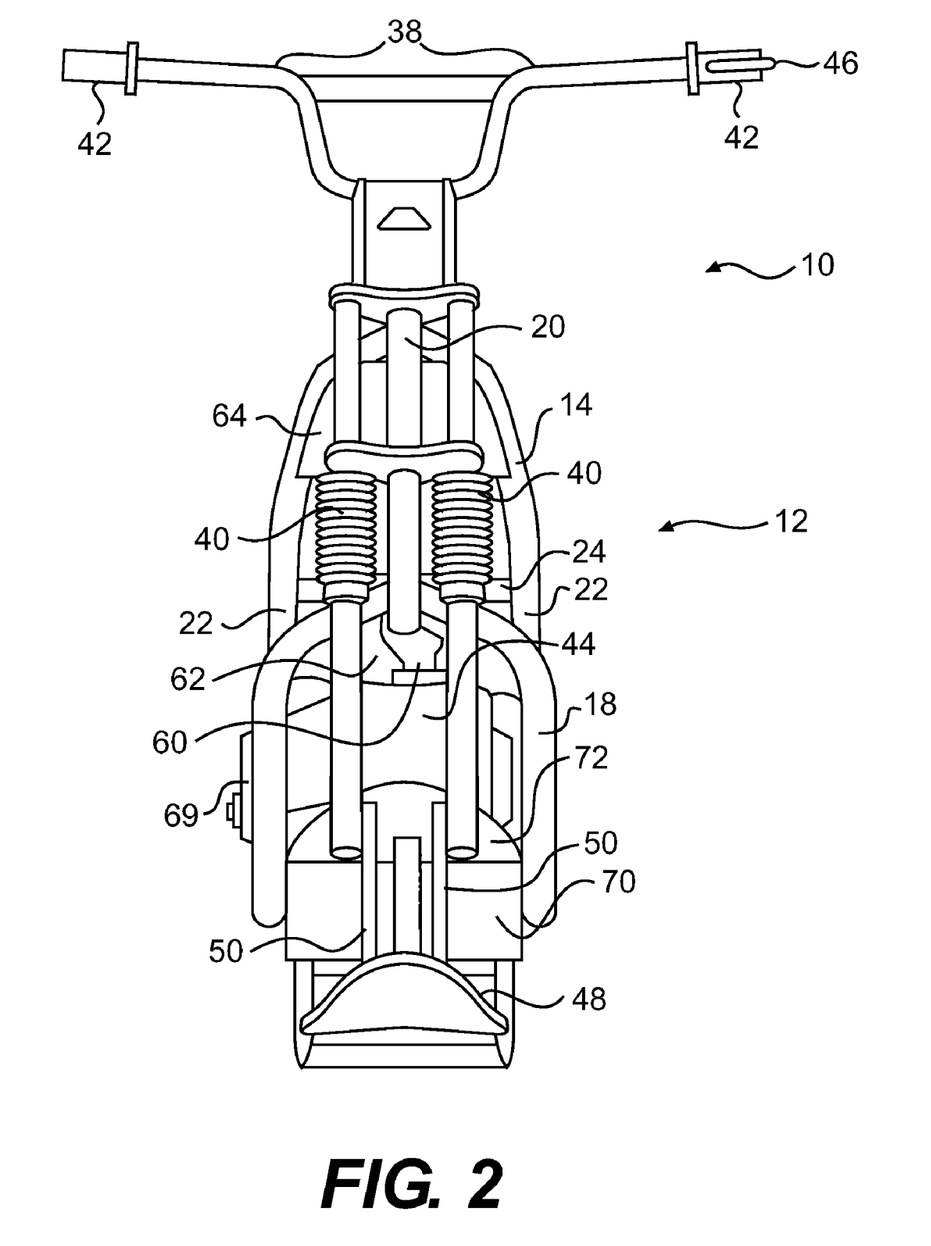
FIG. 2 is a front plan view of the snow vehicle of FIG. 1.
Figure 3:
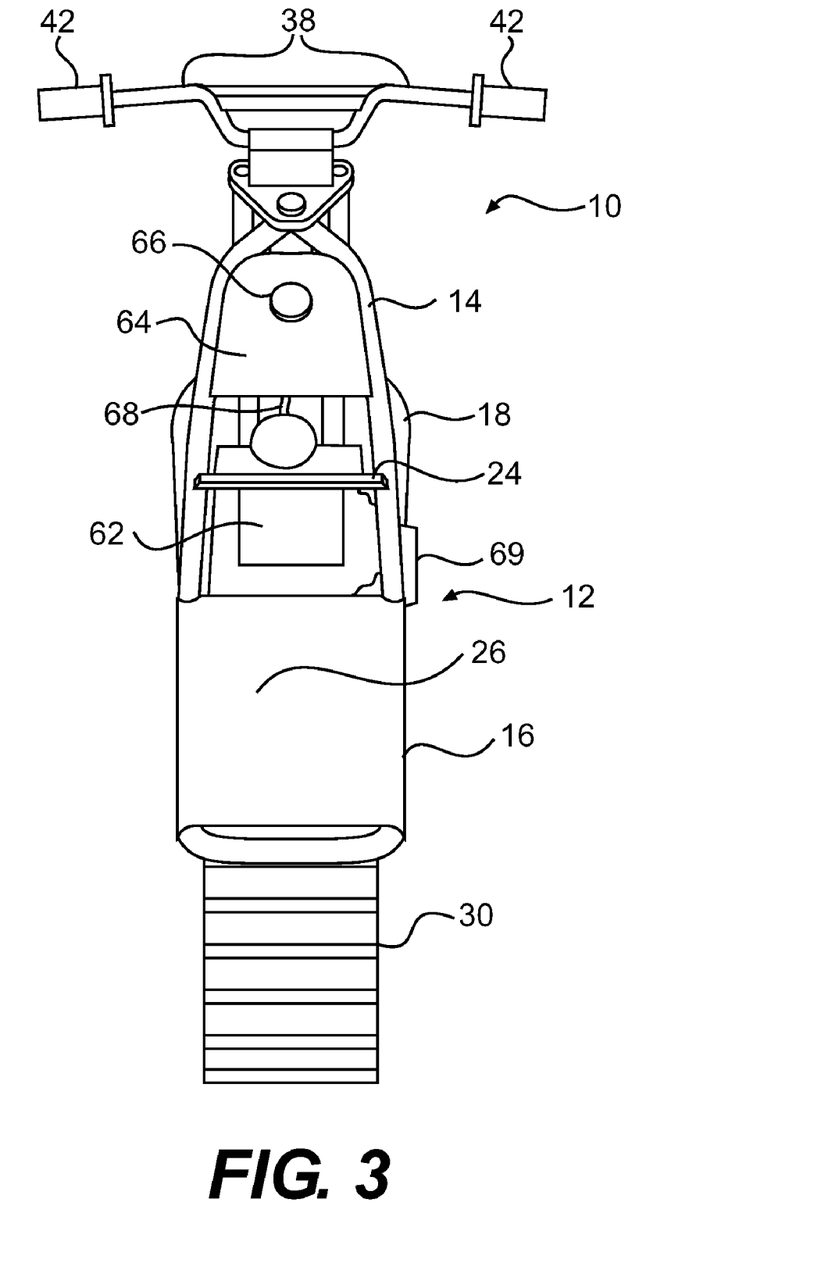
FIG. 3 is a perspective view, taken from a rear side, of the snow vehicle of FIG. 1.
Figure 4:
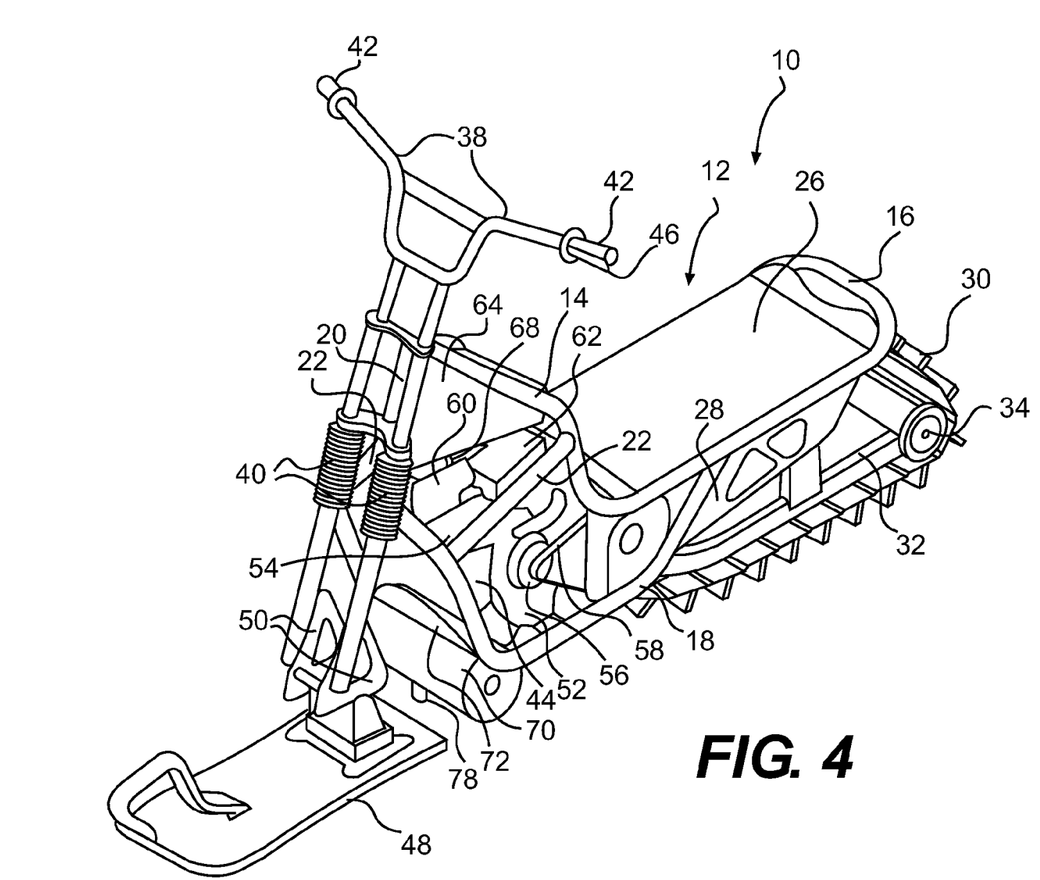
FIG. 4 is a perspective view, taken from a front, left side, of the snow vehicle of FIG. 1.
Figure 5:
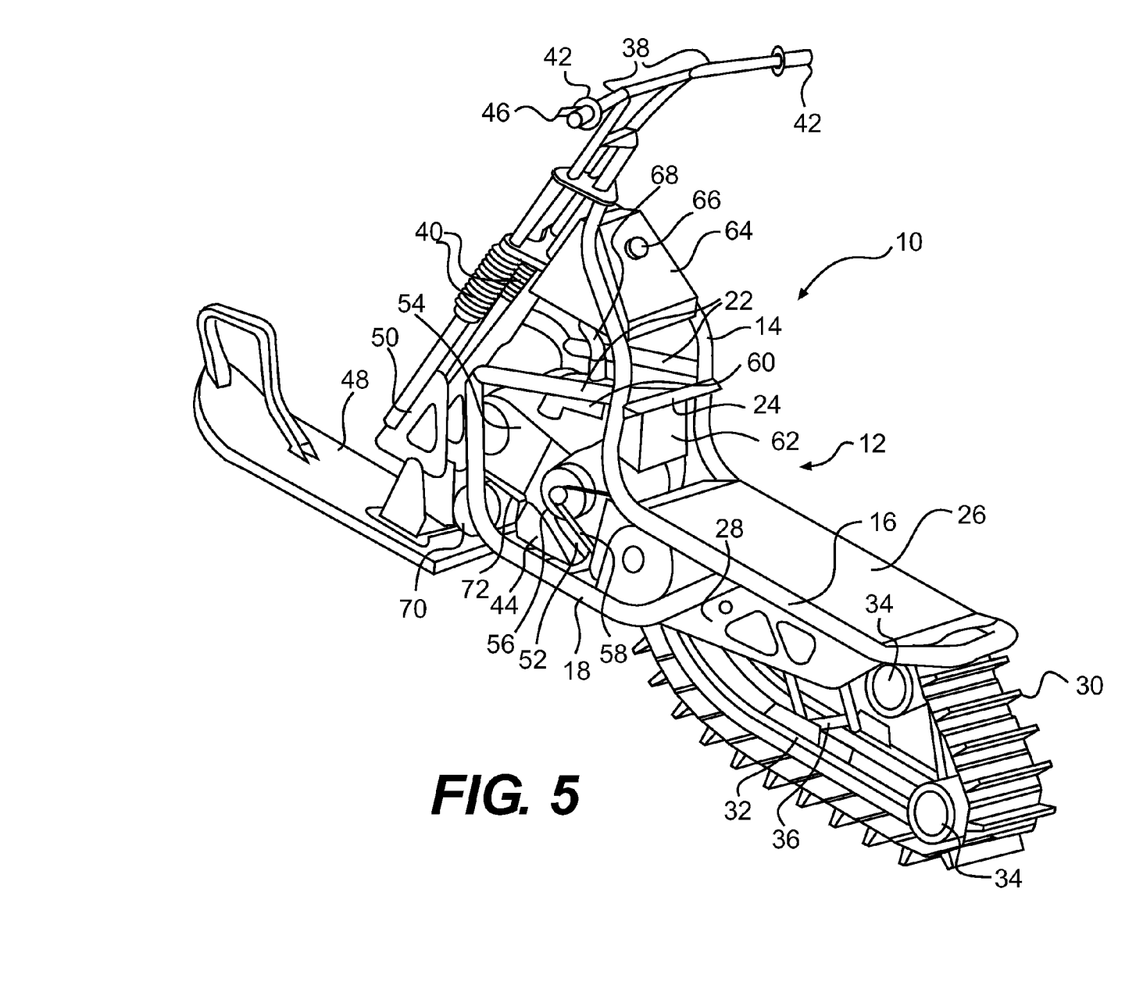
FIG. 5 is a perspective view, taken from a rear, right side, of the snow vehicle of FIG. 1.

The engine 44 of the snow vehicle 10 is mounted to the horizontal portion of the lower frame portion 18 forwardly of the platform 26. The engine 44 has a crankcase 52 and cylinder block 54 containing a cylinder defining a cylinder axis 55. The engine 10 is mounted to the vehicle 10 such that the cylinder is arranged generally horizontally towards a front of the vehicle 10 with the crankcase 52 behind it, as best seen in FIG. 1. A centrifugal clutch 56 is disposed on an output shaft (not shown) of the engine 44. A chain 58 transmits power from the centrifugal clutch 56 to a gear and sprocket assembly (not shown) to turn the endless track 30 as is known in the art. At low engine speeds, the centrifugal clutch 56 is not engaged and therefore does not transmit power to the endless track 30. It is contemplated that a continuously variable transmission (CVT) could also be used to transmit power from the engine 44 to the endless track 30. To brake the snow vehicle 10 during operation, a slotted collar (not shown) is disposed around the centrifugal clutch 56. Actuating the brake lever 46 causes a cable (not shown) to partially close the slot in the collar, thus contracting the collar around the centrifugal clutch 46. This prevents the centrifugal clutch 56 from turning, and therefore it no longer transmits power to the endless track 30.

Figure 6:
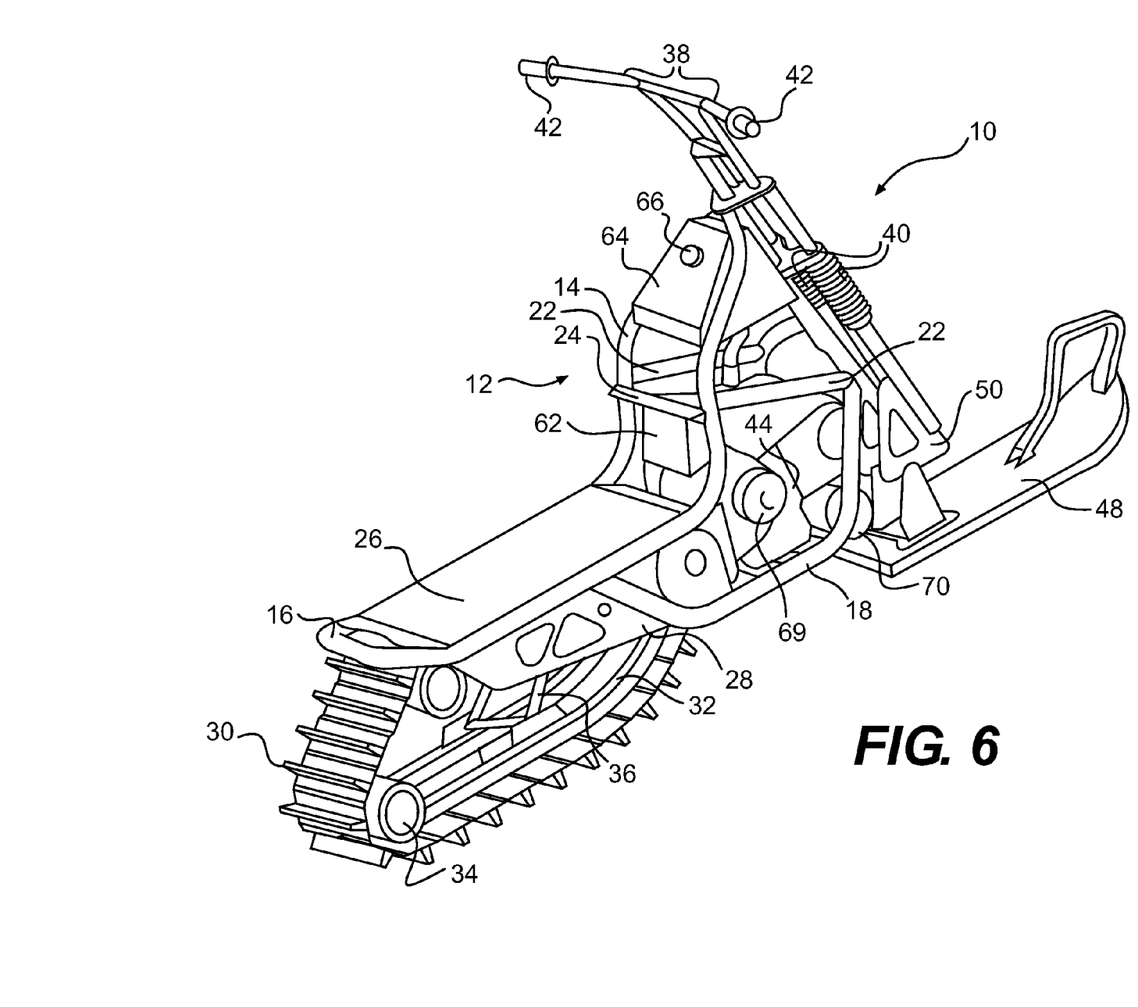
FIG. 6 is a perspective view, taken from a rear right side, of the snow vehicle of FIG. 1.

The engine 44 is preferably a carbureted four-stroke engine. The carburetor 60, which provides the air-fuel mixture to the engine 44, fluidly communicates with the cylinder block 54 and is disposed above the engine 44, as seen in FIG. 1. An air box 62 is connected to an inlet of the carburetor 60 above the crankcase 52 and prevents water (from melted snow) and other debris from entering the carburetor 60 along with the air. The fuel tank 64 of the snow vehicle 10 is mounted to the upper portion of the forward frame portion 14 above the engine 44. The fuel tank has a fuel cap 66 to allow filling of the fuel tank 64. The fuel tank 64 fluidly communicates with the carburetor 60 via fuel line 68 (FIG. 1) to provide fuel to the carburetor 60. The engine 44 is preferably air cooled by a fan 69 disposed on a right side of the engine 44, as best seen in FIG. 6.

An exhaust chamber, in the form of a muffler 70, is mounted below the engine 44 between the suspension elements 40 and the forward end of the platform 26 as seen from a side elevation view of the vehicle 10, as in FIG. 1. It is contemplated that, should the engine 44 be a two-stroke engine, the exhaust chamber could be in the form of a tuned pipe. It is also contemplated that the exhaust chamber could have a catalytic converter disposed therein or attached thereto. The muffler 70 is preferably mounted transversely to a longitudinal axis of the snow vehicle 10 below the cylinder block 54, and therefore the cylinder axis 55, of the engine 44. As can be seen in FIG. 1, the muffler 70 is completely located behind the steering axis 41 and below the cylinder axis 55. In the present embodiment, the muffler 70 is mounted to the lower frame portion 18. In this position, the muffler 70 is exposed to snow which cools it. A shield 72 is disposed between the muffler 70 and the engine 44 to protect the engine 44 from the heat from the muffler 70.

Figure 7:
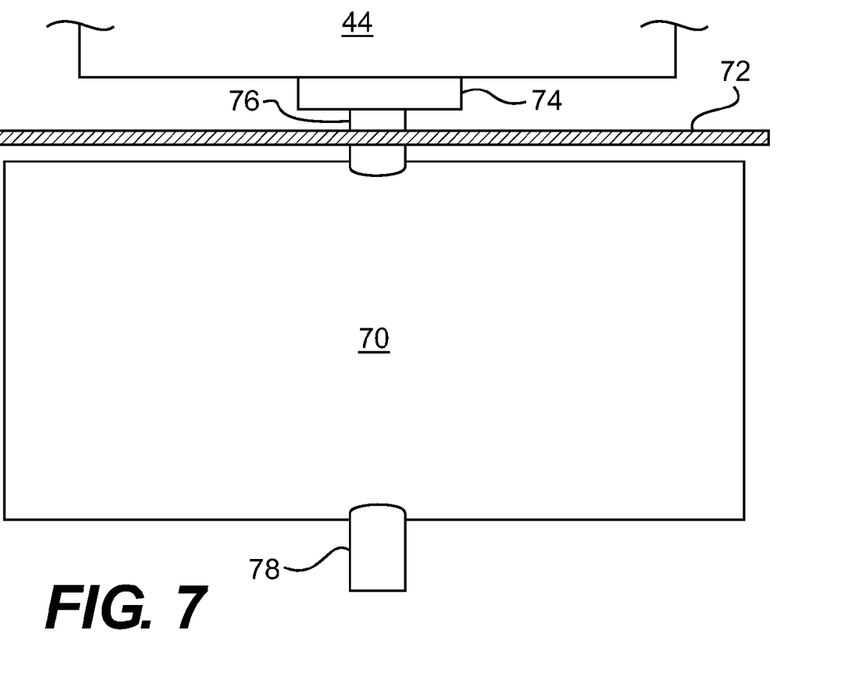
FIG. 7 is a schematic front view of the muffler connected to the engine of the snow vehicle of FIG. 1.
Figure 8:
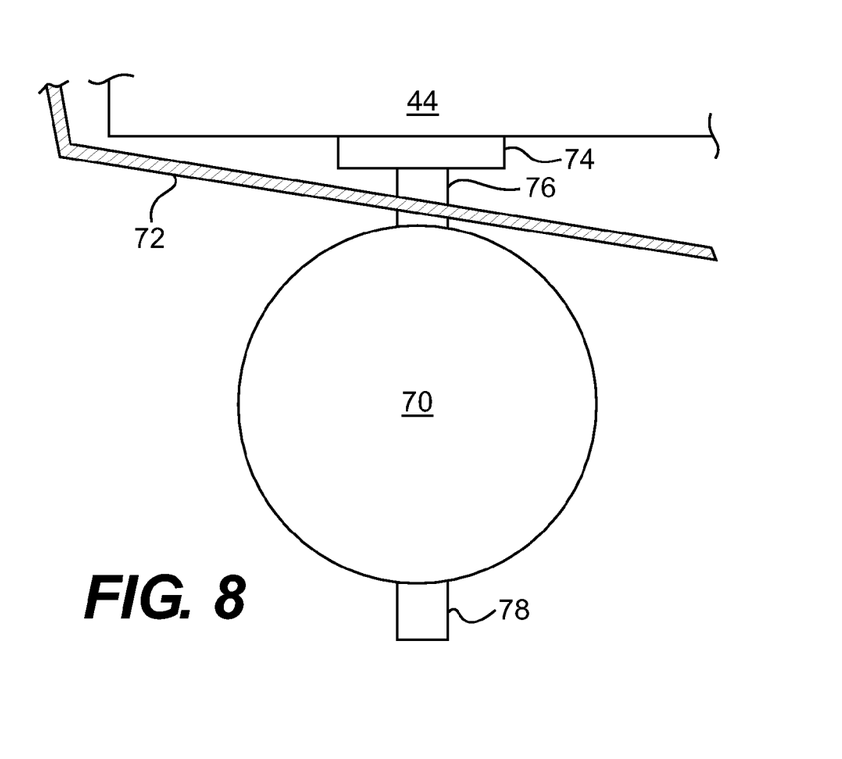
FIG. 8 is a schematic left side view of the muffler connected to the engine of the snow vehicle of FIG. 1.

As is schematically illustrated in FIGS. 7 and 8, the muffler 70 is in fluid communication with an exhaust port 74 of the engine 44 via conduit 76 to receive exhaust gases from the engine 44. The conduit 76 passes through an opening in shield 72. From the muffler 70, the exhaust gases are exhausted to the atmosphere via exhaust conduit 78. The exhaust conduit 78 preferably extends vertically downwardly from the muffler 70. Even more preferably, the exhaust conduit 78 extends from a central portion of the muffler 70. By directing the exhaust gases, and the sound waves traveling through the muffler 70 from the engine 44, the level of sound heard by a rider of the vehicle 10 is reduced.

Therefore, locating the muffler 70, engine 44, and other elements of the engine 44 as described above provides a compact arrangement which keeps the vehicle size to a minimum. Also, since every element of the engine 44 is located behind the steering assembly, this arrangement does not require the addition of covers on the front of the snow vehicle 10, although this is not precluded.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A snow vehicle comprising:
    a frame having a first generally horizontal frame portion and a second frame portion extending generally upwardly from a forward portion of the first frame portion;
    a steering assembly operatively connected to a forward portion of the frame;
    at least one ski connected to the steering assembly;
    a platform disposed on the first frame portion to accommodate a rider in a standing position;
    an endless track mounted to the first frame portion below the platform to propel the snow vehicle;
    an engine mounted to the frame and operatively connected to the endless track to power the endless track, the engine having an exhaust port;
    an exhaust chamber in fluid communication with the exhaust port to receive exhaust gases from the engine, the exhaust chamber being disposed between the steering assembly and the forward portion of the platform when viewed from a side elevation view of the vehicle;
    an exhaust conduit extending from the exhaust chamber to an outlet for fluidly communicating the exhaust chamber with the atmosphere, the outlet being disposed between the steering assembly and the forward portion of the platform when viewed from a side elevation view of the vehicle; wherein the engine comprises a crankcase and a cylinder having a cylinder axis; and
    wherein the cylinder axis extends generally horizontally and the exhaust chamber is disposed below the cylinder axis.

2. The snow vehicle of claim 1, wherein the exhaust chamber is a muffler.

3. The snow vehicle of claim 2, wherein the exhaust conduit extends vertically downwardly from the muffler.

4. The snow vehicle of claim 3, wherein the exhaust conduit extends from a central portion of the muffler.

5. The snow vehicle of claim 2, wherein the muffler is disposed transversely to a longitudinal axis of the snow vehicle.

6. The snow vehicle of claim 1, wherein the exhaust chamber is disposed at least partially below the engine.

7. The snow vehicle of claim 6, further comprising a shield disposed between the engine and the exhaust chamber.

8. The snow vehicle of claim 6, further comprising a fuel tank mounted to the second frame portion above the engine.

9. The snow vehicle of claim 1, wherein the steering assembly further comprises a suspension element; and
    wherein the exhaust chamber is disposed between the suspension element and the forward portion of the platform.

10. The snow vehicle of claim 1, further comprising a centrifugal clutch operatively connected to the engine; and
    wherein the engine powers the endless track via the centrifugal clutch.

11. The snow vehicle of claim 1, wherein the frame further comprises a third frame portion extending forwardly from the first frame portion below the second frame portion.

12. The snow vehicle of claim 11, wherein the frame further comprises a generally extending central frame member joining the third frame member to the second frame member.

13. The snow vehicle of claim 12, wherein the steering assembly is pivotally mounted to the central frame member.

14. The snow vehicle of claim 11, wherein the exhaust chamber is mounted to the third frame portion.

15. The snow vehicle of claim 14, wherein the engine is mounted to the third frame portion.

16. A snow vehicle comprising:
    a frame having a first generally horizontal frame portion and a second frame portion extending generally upwardly from a forward portion of the first frame portion;
    a steering assembly pivotally connected to a forward portion of the frame, the steering assembly pivoting about a steering axis;
    a ski connected to the steering assembly;
    a platform disposed on the first frame portion to accommodate a rider in a standing position;
    an endless track mounted to the first frame portion below the platform to propel the snow vehicle;
    an engine mounted to the frame and operatively connected to the endless track to power the endless track, the engine having an exhaust port and a cylinder axis, the cylinder axis extending generally horizontally;
    a muffler in fluid communication with the exhaust port to receive exhaust gases from the engine, the muffler being disposed rearwardly of the steering axis and below the cylinder axis when viewed from a side elevation view of the vehicle; and
    an exhaust conduit extending from the muffler for fluidly communicating the muffler with the atmosphere.

17. The snow vehicle of claim 16, wherein the muffler is disposed forwardly of the platform.

18. The snow vehicle of claim 16, wherein the exhaust conduit extends vertically downwardly from the muffler.

19. The snow vehicle of claim 16, wherein the muffler is disposed transversely to a longitudinal axis of the snow vehicle.

* * * * *

UNITED STATES PATENT AND TRADEMARK OFFICE
CERTIFICATE OF CORRECTION

| | | |
|---|---|---|
| PATENT NO. | : 7,475,751 B2 | Page 1 of 1 |
| APPLICATION NO. | : 11/395244 | |
| DATED | : January 13, 2009 | |
| INVENTOR(S) | : Jean-Sebastien Pard, Daniel Perreault and Jerome Wubbolts | |

It is certified that error appears in the above-identified patent and that said Letters Patent is hereby corrected as shown below:

Column 3

Line 5, replace "rear, right side" with -- rear, left side --.

Signed and Sealed this

Twenty-fourth Day of March, 2009

JOHN DOLL
*Acting Director of the United States Patent and Trademark Office*